US006882695B1

(12) United States Patent
Kameda et al.

(10) Patent No.: US 6,882,695 B1
(45) Date of Patent: Apr. 19, 2005

(54) DATA TRANSMISSION LINE USED CONTINUOUSLY CONNECTED IN PLURALITY OF STAGES IN ASYNCHRONOUS SYSTEM

(75) Inventors: Takeshi Kameda, Tenri (JP); Tsuyoshi Muramatsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/138,578

(22) Filed: Aug. 24, 1998

(30) Foreign Application Priority Data

Aug. 28, 1997 (JP) .............................................. 9-232209

(51) Int. Cl.$^7$ ................................................. H04L 7/00
(52) U.S. Cl. ....................... 375/354; 375/219; 375/257; 375/295; 375/316
(58) Field of Search ................................ 375/219, 220, 375/257, 295, 316, 354, 356

(56) References Cited

U.S. PATENT DOCUMENTS

| 5,404,539 A | 4/1995 | Onozaki |
| 5,452,464 A | 9/1995 | Nomura et al. |
| 5,483,661 A | 1/1996 | Yoshida et al. |
| 5,577,256 A | 11/1996 | Muramatsu et al. |
| 5,586,281 A | 12/1996 | Miyama et al. |
| 5,590,355 A | 12/1996 | Shichiku et al. |
| 5,630,151 A | 5/1997 | Muramatsu et al. |
| 5,640,433 A | * 6/1997 | Szczebak et al. ............ 375/377 |
| 5,640,525 A | 6/1997 | Yumoto et al. |
| 5,652,906 A | 7/1997 | Kadosumi et al. |
| 5,748,933 A | 5/1998 | Amagai et al. |
| 5,761,737 A | 6/1998 | Kadosumi et al. |
| 5,794,064 A | 8/1998 | Yoshida et al. |
| 5,794,065 A | 8/1998 | Hatakeyama et al. |
| 5,812,806 A | 9/1998 | Muramatsu et al. |
| 5,848,290 A | 12/1998 | Yoshida et al. |
| 5,860,019 A | 1/1999 | Yumoto |
| 5,870,620 A | 2/1999 | Kadosumi et al. |
| 5,872,991 A | 2/1999 | Okamata et al. |
| 5,918,063 A | 6/1999 | Miyama et al. |
| 5,956,517 A | 9/1999 | Okamoto et al. |

FOREIGN PATENT DOCUMENTS

| JP | 62-010729 A | 1/1987 |
| JP | 63-231661 A | 9/1988 |
| JP | 02-031266 A | 2/1990 |
| JP | 04-095185 A | 3/1992 |
| JP | 04-243460 A | 8/1992 |
| JP | 05-081192 A | 4/1993 |
| JP | 683731 | 3/1994 |

OTHER PUBLICATIONS

Kumio Kai and Chuji Honda, "Digital System Design," Published by CQ Shupansha, Sep. 30, 1990, pp. 230–231 (partial English language translation of a Japanese document previously filed in an IDS dated Aug. 24, 1998).

* cited by examiner

Primary Examiner—Tesfaldet Bocure
Assistant Examiner—Pankaj Kumar
(74) Attorney, Agent, or Firm—Birch, Stewart, Kolasch & Birch, LLP

(57) ABSTRACT

A data transmission line used connected continuously in a plurality of stages in an asynchronous system includes a transfer control circuit, synchronous and asynchronous data holding circuits and a timing adjustment circuit. The data transmission line receives and holds data transmitted from a data transmission line of a preceding stage or data output from an external clock synchronous circuit, and outputs and transmits the data to a data transmission line of a succeeding stage. Timing adjustment circuit adjusts data input timing by the transfer control circuit to the synchronous and asynchronous data holding circuits so that data can surely be taken in. It becomes possible to surely take in and transmit data output from external synchronous system in an asynchronous data transmission line at a desired arbitrary timing.

13 Claims, 9 Drawing Sheets

DATA TRANSMISSION LINE USED CONTINUOUSLY CONNECTED IN PLURALITY OF STAGES IN ASYNCHRONOUS SYSTEM

BACKGROUND OF THE INVENTION

1. Field of the Invention

The present invention relates to a data transmission line used continuously connected in a plurality of stages in an asynchronous system. More specifically, the present invention relates to a data transmission line used continuously connected in a plurality of stages in an asynchronous system which is capable of taking data from external dock synchronous system and allows transmission.

2. Description of the Background Art

A data transmission apparatus employing asynchronous hand shake method is sometimes used for data input/output operation using FIFO (First In First Out) memory or data processing apparatus including data driven type information processing operation. In such a data transmission apparatus, a plurality of data transmission lines are connected, and autonomous data transfer takes place with each of the data transmission lines transmitting/receiving to and from each other a data transmission request and a transfer acknowledge (Acknowledge) signal indicating whether data transfer is acknowledged or not.

FIG. 7 is a block diagram showing an example of a conventional data transmission apparatus adapting handshake method.

FIG. 8 is a block diagram showing a configuration of the data transmission line shown in FIG. 7.

Referring to FIG. 7, the data transmission apparatus includes data transmission lines 10, 20 and 30. The data transmission lines include transfer control circuits 10A, 20A and 30A as well as data holding circuits 10B, 20B and 30B, respectively. Each data transmission line is connected to a sequence through a prescribed logic circuit. FIG. 7 shows a configuration where data is sequentially processed by logic circuits 15→25→35 while the data is transferred through data transmission lines 10→20→30, in this order.

FIG. 8 shows block configuration of each data transmission line shown in FIG. 7. In FIG. 8, block configuration of data transmission line 10 is shown as a representative. Other data transmission lines have similar configuration, and therefore description thereof is not repeated. Referring to FIG. 8, data transmission line 10 includes a self-synchronous type transfer control circuit 10A and a data holding circuit 10B formed of a D type flip-flop.

Transfer control circuit 10a receives as an input a pulse CI from a preceding stage (not shown), outputs acknowledge signal RO indicating acknowledgement or inhibition of transfer to the preceding stage, outputs a pulse CO to a succeeding stage (not shown), receives as an input an acknowledge signal RI representing acknowledgement or inhibition of data transfer from the succeeding stage, and outputs a clock pulse CP controlling data holding operation to data holding circuit 10B.

Upon reception of pulse CI from the preceding stage, when acknowledge signal RI from the succeeding stage indicates acknowledged state, transfer control circuit 10A outputs pulse CO to the succeeding stage, and outputs pulse CP to data holding circuit 10B. In response to pulse CP applied from transfer control circuit 10A, data holding circuit 10B holds data DI applied from the preceding stage, and outputs the held data as data DO to the succeeding stage.

The data transmission line of FIG. 7 will be described with reference to FIG. 8. Referring to FIG. 7, transfer request signal C20 is transmitted as pulses CI and CO from transfer control circuit 10A to 20A. A transfer request signal C30 as pulses CO and CI is transmitted from transfer control circuit 20A to transfer control circuit 30A. Acknowledge signal R20 is transmitted as acknowledge signals RO and RI from transfer control circuit 20A to transfer control circuit 10A. Acknowledge signal R30 as acknowledge signals RO and RI is transmitted from transfer control circuit 30A to 20A. Transfer control circuit 10A receives transfer request signal C10, as pulse CI, from a transfer control circuit of a preceding stage, not shown. A transfer request signal C40 is output as pulse CO to a transfer control circuit of a succeeding stage, not shown, from transfer control circuit 30A. Acknowledge signal RIO is output as acknowledge signal RO from transfer control circuit 10A to a transfer control circuit of a preceding stage, not shown. Transfer control circuit 30A receives acknowledge signal R40 as acknowledge signal RI, from a transfer control circuit of a succeeding stage, not shown.

Referring to FIG. 7, when data transmission line 10 is at a data holding state and data transmission line 20 of the succeeding stage is at a data holding state, data is not transmitted from data transmission line 10 to data transmission line 20. When data transmission line 20 of the succeeding stage is in a state not holding data (or when it attains the state not holding data), data is transmitted from data transmission line 10 to data transmission line 20 with at least a preset delay time.

The above described manner of control where data is transferred asynchronously in accordance with transfer request signals and acknowledge signals transmitted/received to and from adjacent data transmission lines with at least a preset delay time is referred to as self-synchronous transfer control, and a circuit controlling such data transfer is referred to as self-synchronous transfer control circuit.

FIG. 9 is a circuit diagram showing an example of a conventional self-synchronous transfer control circuit. FIG. 10 is a time chart related to the operation of the circuit shown in FIG. 9.

The circuit of FIG. 9 receives pulse CI as the transfer request signal from a preceding stage, not shown, and outputs acknowledge signal RO to the preceding stage, not shown. Further, the circuit outputs pulse CO as the transfer request signal to a succeeding stage, not shown, and receives acknowledge signal RI from the succeeding stage, not shown. Further, the circuit of FIG. 9 receives a master reset signal /MR (/MR represents an inversion of MR).

In the following, "H" and "L" represent High and Low signal levels, respectively.

The circuit of FIG. 9 includes RS flipflops 111 and 112, inverters 130, 170 and 180, a 4-input NAND gate 140 and a delay element 190. RS flipflop 111 includes NAND gates 110 and 120, and when a pulse of "L" level is applied to a node /S, RS flipflop 111 is set in response. Thus RS flipflop 111 stores "L" pulse, and provides a signal at "H" level at a node Q. When "L" pulse is applied to a node /R, RS flipflop 111 is reset. Thus, RS flipflop 111 outputs a signal of "L" at node Q. RS flipflop 112 includes NAND gates 150 and 160. The operation of RS flipflop 112 is similar to that of RS flipflop 111.

Pulse CI is applied to a first input, an output signal from node Q of RS flipflop 111 is applied to a second input, acknowledge signal RI is applied to a third input and an output signal from inverter 180 is applied to a fourth input, of 4-input NAND gate 140.

That the acknowledge signal RO is at "H" means that the circuit of FIG. 9 acknowledges transfer of data from the proceeding stage, and that the signal is at "L" means that data transfer from the preceding stage is inhibited. That the pulse CI is at "L" represents that a data transfer is requested from the preceding stage and that the pulse CI is at "H" means that data transfer is not requested from the preceding stage.

The operation of the transfer control circuit shown in FIG. 9 will be described with reference to the time chart of FIG. 10.

In FIG. 10, the ordinate represents signal levels of various signals shown in FIG. 9, and the abscissa represents time.

First, when a pulse at "L" is applied as master reset signal /MR, the transfer control circuit of FIG. 9 is initialized. Consequently, pulse CO, the output at node /Q and acknowledge signal RO attain "H", respectively.

When acknowledge signal RO indicates acknowledged state in the circuit of FIG. 9 and the pulse CI is applied at "L" from the preceding stage at time T of FIG. 10, RS flipflop 111 is set, and the output of node Q attains "H". Consequently, acknowledge signal RO attains "L" (inhibited state), whereby further data transfer from the preceding stage is inhibited. After a prescribed time period, the pulse CI attains "H". The output G from NAND gate 140 attains "L" when RS flipflop 111 stores reception of a data transfer request from the preceding stage of the circuit shown in FIG. 9 (that is, output of node Q is at "H"), pulse CI is returned to "H", the transfer control circuit is not issuing data transfer request to the succeeding stage (that is, pulse CO is at "H") and acknowledge signal RI indicates acknowledged state (signal RI is at "H"). When the output G from NAND gate 140 attains "L", RS flipflop 111 is reset, and RS flipflop 112 is also reset. As the output of RS flipflop 112 is at "L", the pulse CP applied to the corresponding data holding circuit obtained through inverter 170 rises to "H". A clock pulse for holding data is applied to the corresponding data holding circuit when pulse CP rises to "H" and, in response, the data holding circuit latches applied data DI and outputs this as data DO. Further, the output of inverter 170 passes through inverter 180 and delay element 190, and sets the pulse CO to "L". Consequently, the pulse CI to be applied to the transfer control circuit of the succeeding stage is set to "L", so as to request data transfer to the transfer control circuit of the succeeding stage. Accordingly, the transfer control circuit of the succeeding stage receives the transfer request signal from the transfer control circuit in the preceding stage.

After the lapse of a prescribed time period, the circuit of FIG. 9 receives acknowledge signal RI set at the inhibited state ("L") from the transfer control circuit of the succeeding stage which has received the transfer request signal, and hence flipflop 112 is set. Accordingly, clock pulse CP attains "L" and the pulse CO returns to "H".

Thereafter, the data transmission line of the succeeding stage transfers data to the data transmission line of the second succeeding stage, whereby the acknowledge signal RI in the circuit shown in FIG. 9 returns to "H". This allows new data transfer to the data transmission line of the succeeding stage.

An improvement of the transfer control circuit described above is proposed in Japanese Patent Laying-Open No. 6-83731. Here, the content, which is described in detail in this laid-open application, will be briefly outlined. According to the disclosure of the laid-open application, a self-synchronous transfer control circuit is provided which can acknowledge or prohibit data transfer at an arbitrary timing. Therefore, in data transfer lines and logic circuits arranged between the data transfer lines, formed incorporating the self-synchronous transfer control circuit provided in accordance with the disclosure of the laid-open application, it is possible to perform, step by step, timing verification of data or signal transfer and tracing of operation in debugging the processed contents.

In the above described conventional transfer control circuit, when the data transmission line of the succeeding stage is in an empty state (acknowledge signal RI is "H"), data is autonomously and successively transferred to the data transmission lines of the succeeding stages. Assuming that data output from an external dock synchronized circuit such as a clock or a register in which result of calculation by a CPU (Central Processing Unit) is written is taken into the asynchronous data transmission line in the middle of the data transfer apparatus, the output data of the clock synchronous circuit will be taken into the data holding circuit at a timing, represented by the signal level of clock pulse CP from the transfer control circuit.

The clock driving the clock synchronous circuit is not at all co-related to the clock pulse CP output from the transfer control circuit in the asynchronous data transmission line, in other words, the asynchronous system operates at an arbitrary timing independent from the synchronous system, the data output from the clock synchronous circuit is taken into the data holding circuit at a timing which cannot be expected at all. Therefore, the data output from the clock synchronous circuit cannot taken in the data holding circuit at desired timing and, further, it is possible that the data which is in transition in the clock synchronous circuit may undesirably be taken in the data holding circuit.

The technique disclosed in Japanese Patent Laying-Open No. 6-83731 mentioned above is directed to debugging of a data processing apparatus including a data driven type information processing unit. It is not directed to debugging of an IC on which data driven type information processing unit and a clock synchronous circuit such as a von Neumann type CPU mounted mixedly. Therefore, the technique does not take into consideration taking of data output from an external clock synchronous circuit to an asynchronous data transmission line in the middle of the data transfer apparatus. Therefore, it has been impossible to take in data (signal) output from an external synchronous system in a data transmission line of an asynchronous system including data driven type information processing unit, at a desired arbitrary timing.

SUMMARY OF THE INVENTION

An object of the present invention is to provide a data transmission line used continuously connected in a plurality of stages in an asynchronous system, allowing taking of data (signal) output from an external synchronous system arbitrary at a desired timing.

The above described object of the present invention can be attained by the data transmission line used continuously connected in a plurality of stages in an asynchronous system, including a data holding unit receiving as input, and holding, data transmitted from a preceding stage or output from an external synchronous system, for outputting and transmitting the data to a succeeding stage; a transfer control unit for controlling data input to and output from the data holding unit; and an adjustment unit for adjusting, when a mode for taking in and transmitting data output from a synchronous system to a transmission line of the asynchronous system is designated, timing of input of data output from the synchronous system and data transmitted in the asynchronous system from the preceding stage, to the data holding unit, by the transfer control unit.

Accordingly, in the data transmission line of the asynchronous system, the data output from the asynchronous system and the data transmitted from the preceding stage in the asynchronous system have timings of input to the data holding unit by the transfer control unit adjusted by the timing adjustment unit, and therefore it becomes possible to take in synchronous data externally and transmit the data in the asynchronous system.

Accordingly, it becomes possible to take in data output from an external asynchronous system such as a von Neumann type CPU to a data transmission line of an asynchronous system including a data driven type information processing unit, at an arbitrary timing and to process and transmit the data. Therefore, an IC having a data driven type information processing circuitry and a clock synchronous von Neumann type information processing circuitry mounted mixedly can readily be provided.

The data holding unit mentioned above may include an asynchronous system holding circuit for holding data transmitted in the asynchronous system and a synchronous holding circuit for holding data output from the synchronous system.

In this manner, the data holding unit, provided with a data holding circuit for the synchronous system and the data holding circuit for the asynchronous system provided separately, can operate dedicated processes respectively.

The data transmission line further includes a buffer unit controlled by the synchronous system, and the buffer unit is provided between the synchronous system and the data holding unit.

Provision of the buffer unit enables continuous taking of data output from the synchronous system to the data holding unit.

Therefore, even when the data output from the synchronous system changes earlier than the timing of asynchronous handshake of the transmission line of the asynchronous system, it is possible to continuously take data output from the synchronous system into the data holding unit, whereby data transmission efficiency is improved.

In the data transmission line described above, in response to completion of data input to the data holding unit, mode designation may be canceled.

Therefore, when data input from the synchronous and asynchronous systems to the data holding unit is completed, mode designation is canceled and operation of the timing adjustment unit is stopped. Therefore, the data transmission line switches to normal operation state of the asynchronous system.

Accordingly, other than when data output from external synchronous system is taken in, timing adjustment is not performed by the timing adjustment unit. Therefore, unnecessary time adjustment in the data transmission line is avoided, and therefore speed of data transmission is not degraded, while taking of data from the synchronous system is allowed.

In the data transmission line mentioned above, the transfer control unit may include a first storage unit, a second storage unit, a third storage unit and a logic unit, for transferring a first pulse applied from a preceding stage as a second pulse to a succeeding stage, in accordance with a designation signal designating acknowledgement or inhibition of transfer.

The first storage unit stores the first pulse. The second storage unit is reset in response to the inhibition state of the designating signal. The third storage unit is set in response to input of the first pulse, and reset in response to an input of a third pulse which is applied arbitrarily. The logic unit outputs a fourth pulse in response to the fact that the first storage unit stores the first pulse, the first pulse is not being applied to the first storage unit, the second storage unit is reset, the designating signal is at an acknowledged state, and the third storing unit is reset.

The first storage unit is reset by an input of a fourth pulse, and the second storage unit stores the fourth pulse and generates a second pulse.

The adjustment unit of the data transmission line generates the third pulse with a desired timing provided between data transmission in the asynchronous system and the clock of the synchronous system, in response to the fact that the first storage unit stores the first pulse and the first pulse is not being applied to the first storage unit.

Therefore, in the transfer control unit, as long as at least the third storage unit is set, in other words, unless the third storage unit, not receiving the external third pulse, is reset, the logic unit does not generate the fourth pulse, and hence transfer of the pulse from the first storage unit to the second storage unit is suppressed.

Accordingly, simply by applying the third pulse arbitrarily as desired, the operation of transferring the first pulse applied from the preceding stage of the transmission line as the second pulse to the transmission line of the succeeding stage can be prevented by the transfer control unit. As the adjustment unit is configured to generate the third pulse at a desired timing, the timing of transferring the first pulse applied from the preceding stage as the second first to the succeeding stage can readily be set at a desired value, and therefore it becomes possible to readily and surely take in and transmit the data output from the synchronous system to the transmission line of the asynchronous system.

The above described asynchronous system includes a data driven type information processing unit, and the synchronous system described above includes a clock synchronous information processing unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in detail with reference to the drawings. Here, an example in which data output from a synchronous system is taken in a data transmission line of an asynchronous system will be described.

Figure 4:
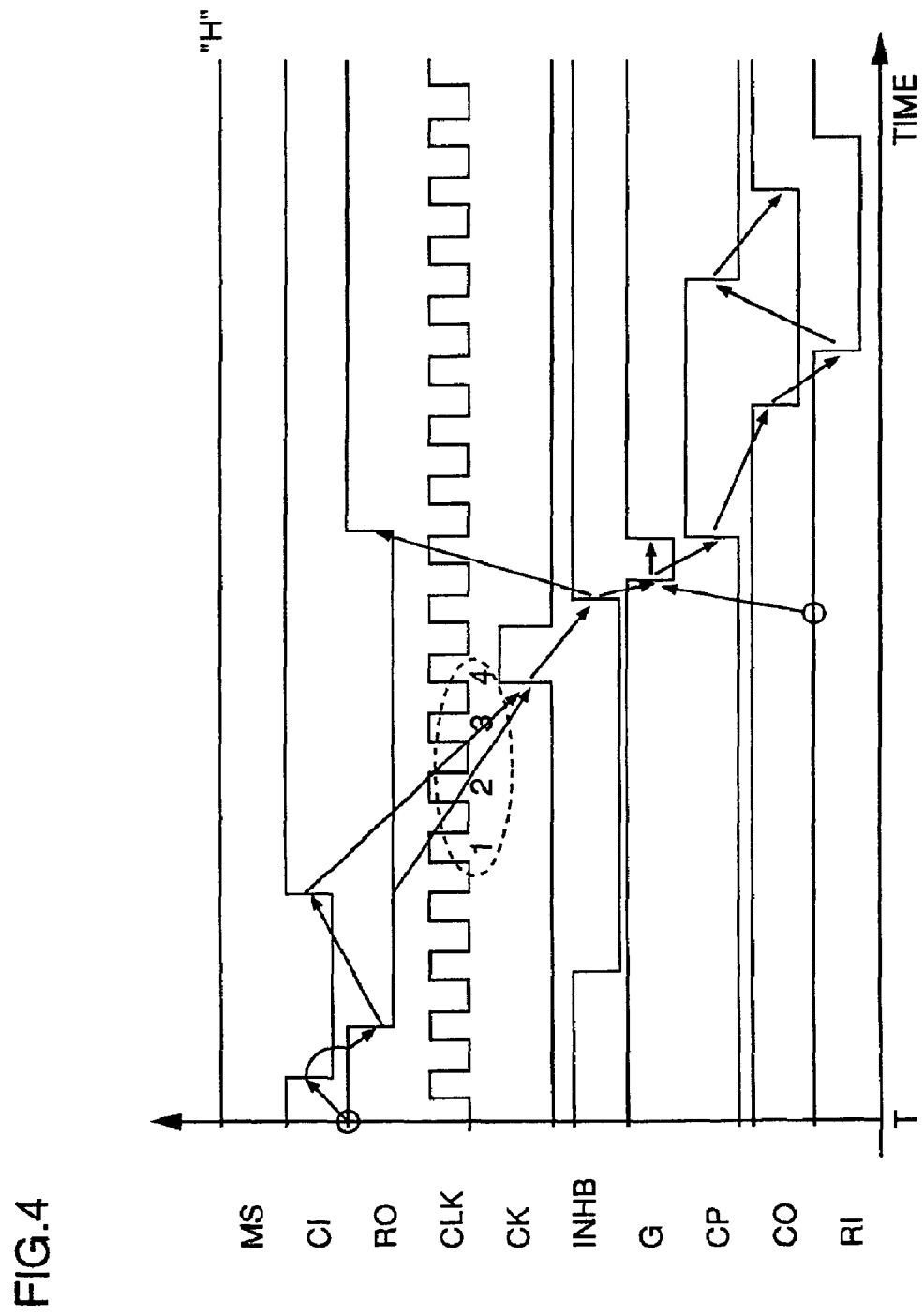
FIG. 4 is a time chart illustrating the operation of the transfer control circuit and the timing adjustment circuit shown in FIG. 2.

In FIG. 4, the ordinate represents levels of various signals, and the abscissa represents time.

Figure 3:
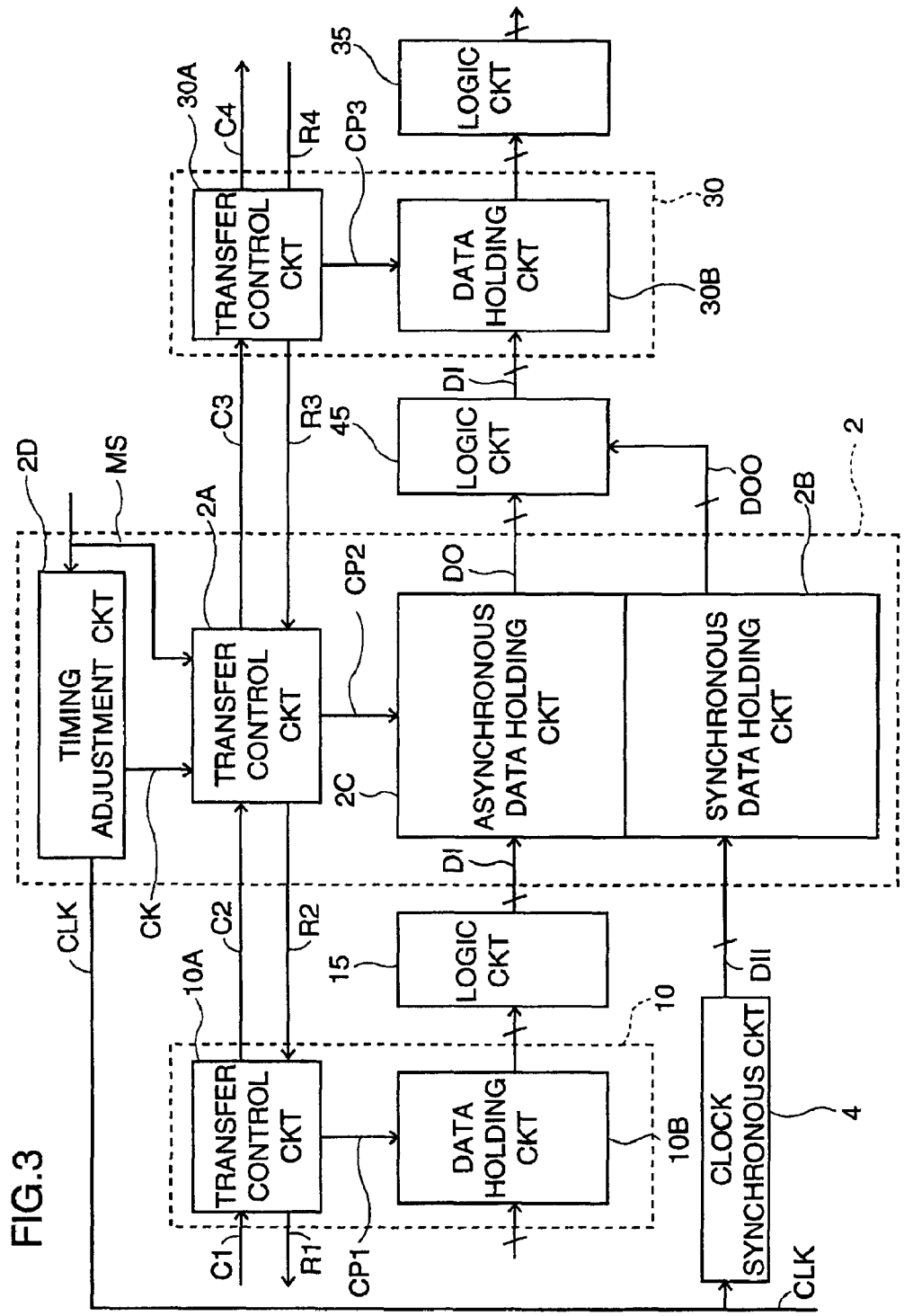
FIG. 3 shows configuration of an asynchronous system data transmission apparatus including a data driven type information processing and a data processing apparatus including a clock synchronous circuit, in accordance with in embodiment of the present invention.

Referring to FIG. 3, the data processing apparatus includes data transmission lines 10, 2 and 30. Data transmission lines 10 and 30 include data holding circuits 10B and 30B, respectively. Data transmission line 2 includes an asynchronous holding circuit 2C receiving as an input data DI transmitted in the asynchronous system, holding the same and outputting the same as data DO, and a synchronous data holding circuit 2B receiving as an input an output data DII of the synchronous system from external clock synchronous circuit 4, holding the same and outputting the same as data DOO. Respective data transmission lines are sequentially connected through prescribed logic circuits 15, 45 and 35. In the figure, data is subjected to general operation such as addition, subtraction, multiplication and division sequentially in logic circuits 15→45→35 while the data is successively transmitted through data transmission lines 10→2→30. Here, data DII, which is an output of dock synchronous circuit 4, which is a synchronous device such as CPU, is also taken in the data transmission line 2. As data DI, which is the output of logic circuit 15, and output data DII of clock synchronous circuit 4 are applied at arbitrary timings through data transmission line 2, logic circuit 45 processes both of these data, and applies the result of processing as data DI to transmission line 30.

A pulse transfer request signal C2 is transmitted from transfer control circuit 10A to transfer control circuit 2A. A pulse transfer request signal C3 is transmitted from transfer control circuit 2A to transfer control circuit 30A An acknowledge signal R2 is transmitted from transfer control circuit 2A to transfer control circuit 10A. An acknowledge signal R3 is transmitted from transfer control circuit 30A to transfer control circuit 2A.

A pulse transmission request signal C2 is transmitted to transfer control circuit 10A from a transfer control circuit of a preceding stage, not shown. Transfer control circuit 30A transmits a pulse transfer request signal C4 to a transfer control circuit of a succeeding stage, not shown. Transfer control circuit 10A transmits an acknowledge signal R1 to the transfer control circuit of the preceding stage, not shown. Transfer control circuit 30A receives, from the transfer control circuit of the succeeding stage, not shown, an acknowledge signal R4.

In FIG. 3, when data transmission line 10 is in a data holding state and data transmission line 2 of the succeeding stage is in the data holding state, data is not transmitted from data transmission line 10 to data transmission line 2. When data transmission line 10 is in a data holding state and data transmission line 2 is in a state not holding data (or attains a state not holding the data), then data is transmitted from transmission line 10 to data transmission line 2 over at least a preset delay time.

The transfer control circuit in accordance with the present embodiment normally operates in the similar manner as the above described conventional transfer control circuit. When data transmission line 2 takes in data DII output from the external clock synchronous circuit 4, it operates so as to allow taking of the data at a desired timing.

Figure 1:
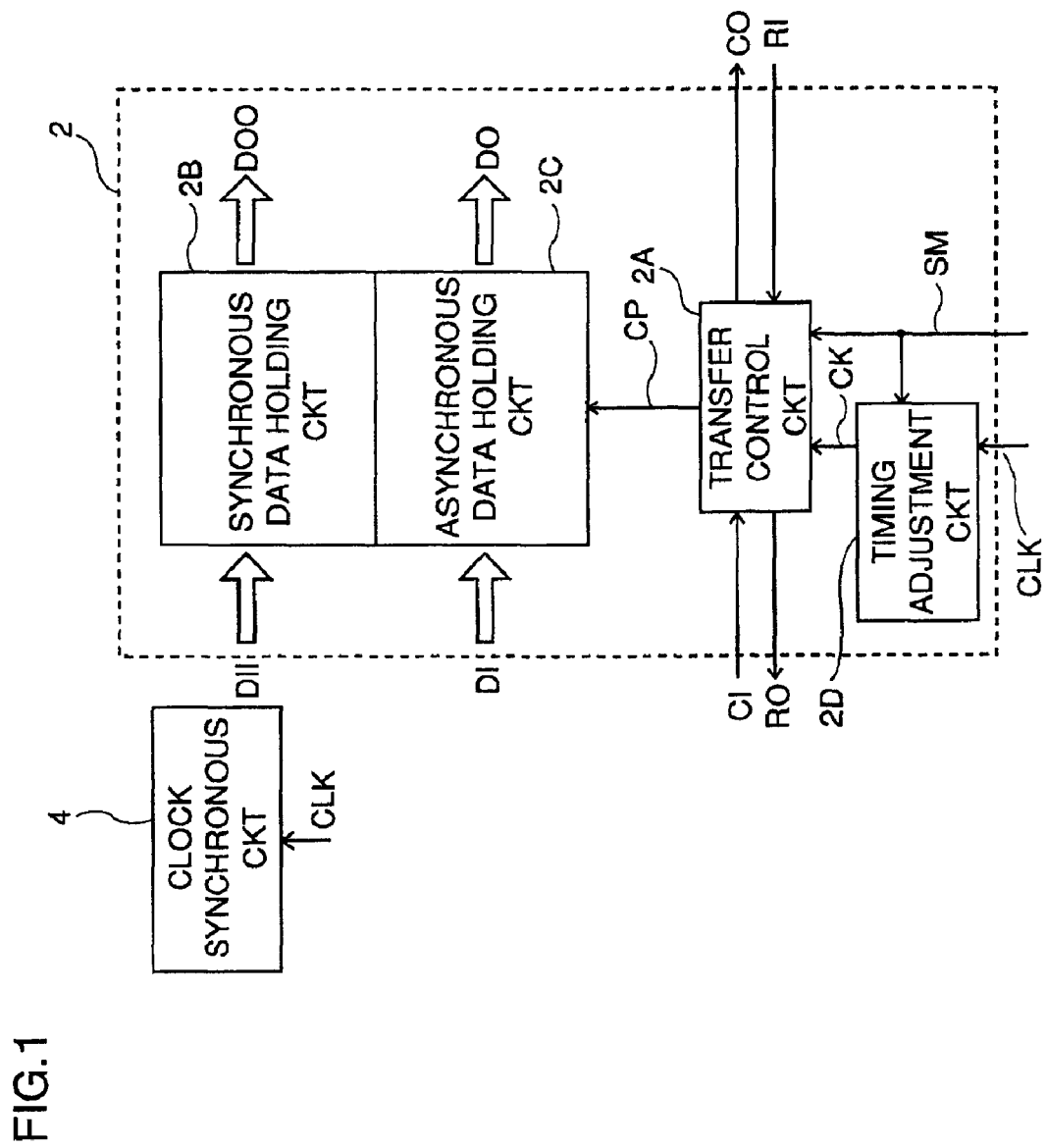
FIG. 1 shows configuration of the data transmission line including a transfer control circuit and a timing adjustment circuit, in accordance with an embodiment of the present invention.

FIG. 1 shows block configuration of data transmission line 2 shown in FIG. 3. In FIG. 3, conventional data transmission lines are used as the data transmission lines other than data transmission line 2. Therefore, description thereof is not repeated. Here, only the data transmission line 2 will be described.

Data transmission line 2 of FIG. 1 includes a transfer control circuit 2A, synchronous and asynchronous data holding circuits 2B and 2C, and a timing adjustment circuit 2D. Synchronous and asynchronous data holding circuits 2B and 2C each include a D type flip-flop.

Similar to conventional transfer control circuit 20A, transfer control circuit 2A receives as an input, the pulse CI, outputs pulses CP and CO, receives as an input transfer acknowledge signal RI, and outputs an acknowledge signal RO. Different from the conventional transfer control circuit 20A, transfer control circuit 2A receives a mode signal MS from outside the data transmission line, and receives a dock CK from timing adjustment circuit 2D.

Timing adjustment circuit 2D receives dock CLK and mode signal MS from outside the data transmission line, and outputs clock CK to transfer control circuit 2A. Mode signal MS and dock CLK are applied to the data transmission line from an external control apparatus, not shown.

Mode signal MS is for setting the transfer control circuit 2A in the above described autonomous operation mode or an operation mode in which transmission of the transfer request signal is controlled based on the clock CK. When mode signal MS is at "L", transfer control circuit 2A is set in the autonomous operation mode and operates in the similar manner as the self-synchronous transfer control circuit described above. When mode signal MS is at "H", transfer control circuit 2A is set to operation mode in which transmission of the transfer request, signal is controlled based on the applied clock signal CK.

Figure 2:
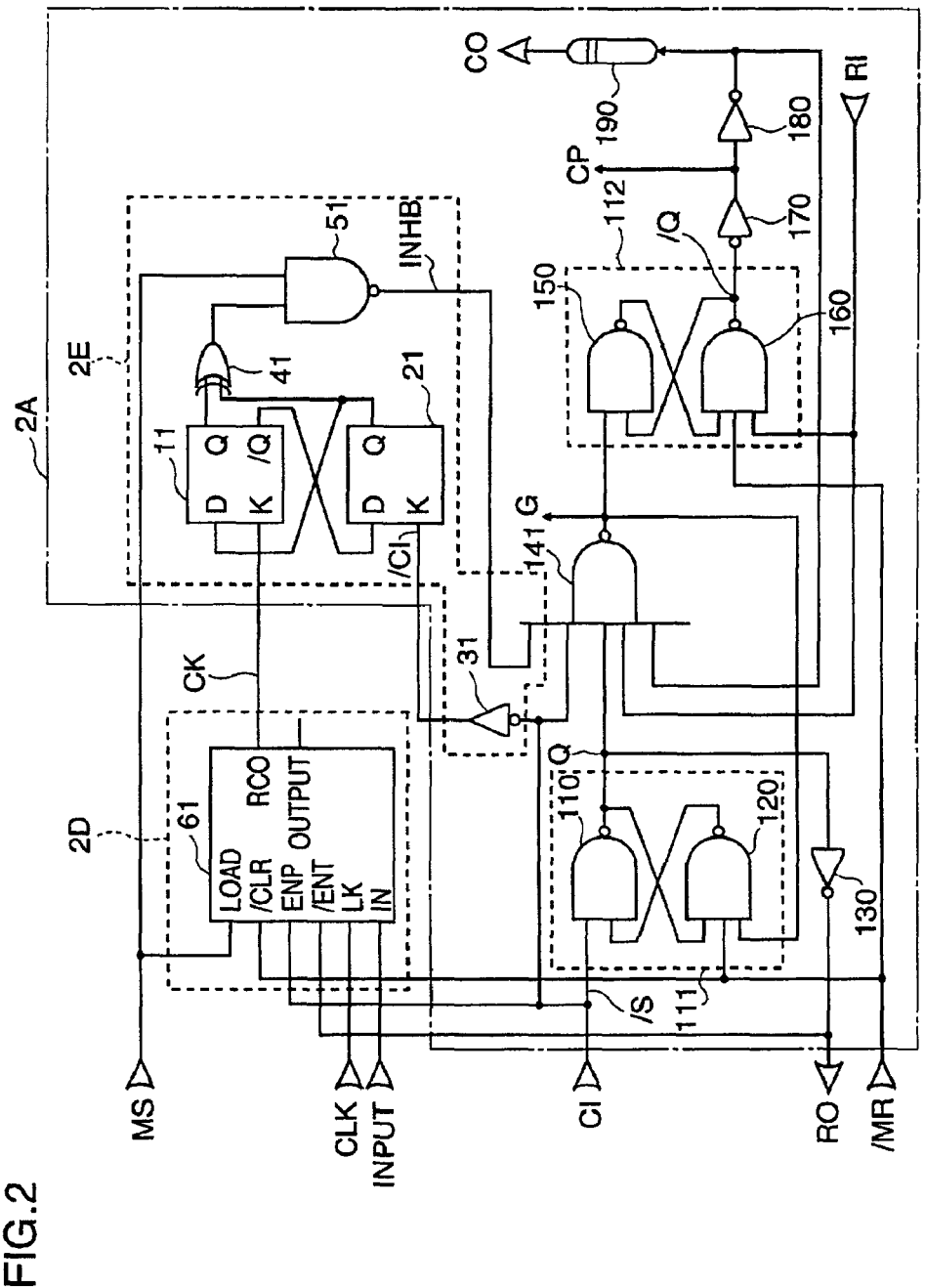
FIG. 2 is a schematic diagram showing configurations of the transfer control circuit and the timing adjustment circuit shown in FIG. 1.
Figure 9:
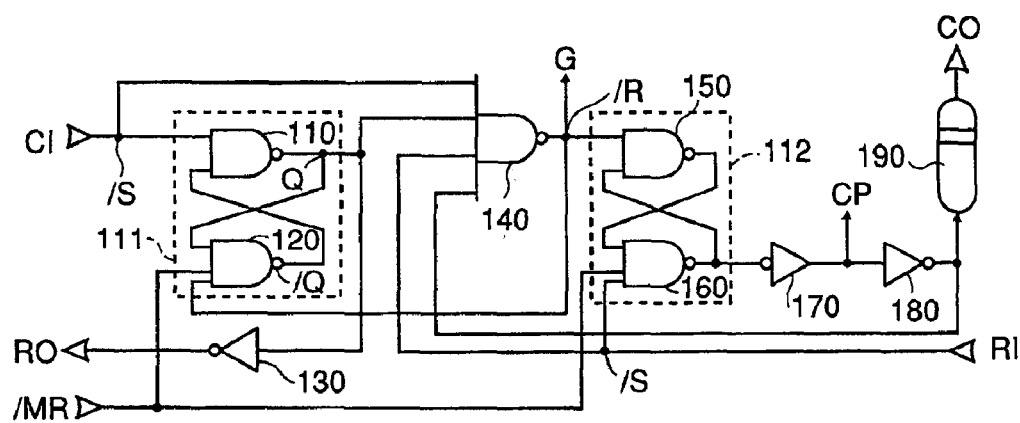
FIG. 9 is a circuit diagram showing an example of a conventional self-synchronous transfer control circuit.
Figure 10:
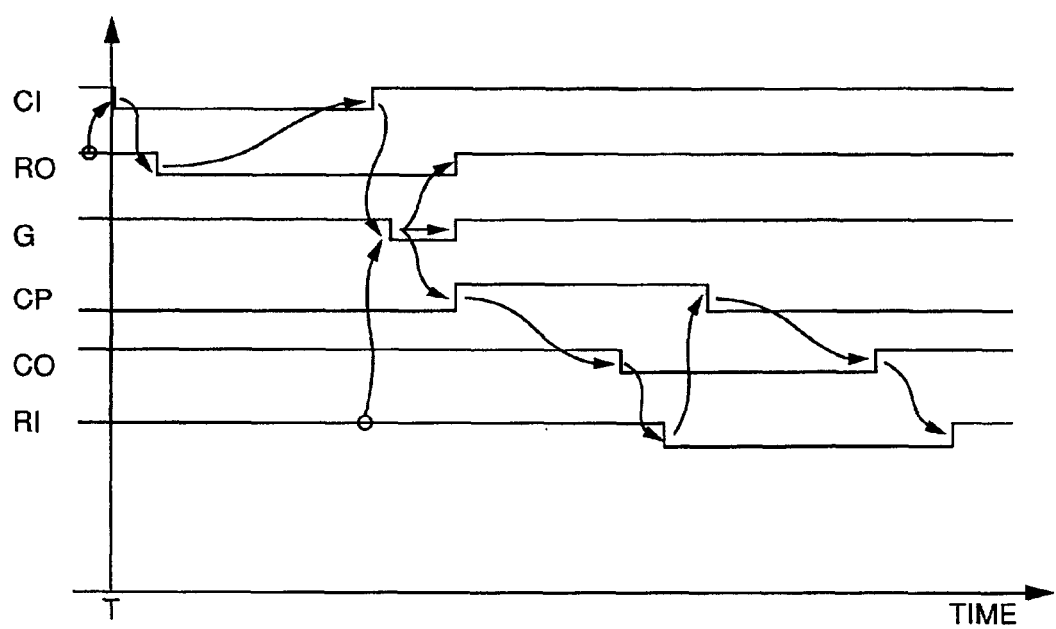
FIG. 10 is a timing chart related to the operation of the circuit shown in FIG. 9.

FIG. 2 shows transfer control circuit 2A and timing adjustment circuit 2D. Transfer control circuit 2A includes an NAND gate 141 in place of NAND gate 140 of the conventional transfer control circuit shown in FIG. 9, and in addition, newly includes a transfer request control unit 2E. Except these points, the configuration is the same as the conventional example.

NAND gate 141 has first to fifth inputs and, to the first input, an output INHB from the transfer request control unit 2E, which will be described later, is applied. To the second to fifth inputs, the first to fourth inputs for the conventional NAND gate 140 are applied.

Transfer request control unit 2E includes D type flipflops 11 and 21, an inverter 31, an EXOR gate 41 and an NAND gate 51. In flipflop 21, a pulse CI indicating a transfer request is applied through inverter 31 to a node K, a node D is connected to a node /Q of flipflop 11, a node Q is connected to a node D of flipflop 11 and to one input of EXOR gate 41. In flipflop 11, a node K receives clock CK, and node Q is connected to the other input of EXOR gate 41. The output INHB of NAND gate 51 is applied to the first input of NAND gate 141 as already described.

Timing adjustment circuit 2D includes a down counter 61. As to the input to down counter 61, mode signal MS is applied to a node LOAD, a master reset signal /MR is applied, to a node /CLR, pulse CI is applied to a node ENP, acknowledge signal RO is applied to a node /ENT, an external clock CLK is applied to a clock input node LK, and an initialization value INPUT is applied to a node IN. As to the output from down counter 61, clock CK is output from a node RCO to node K of transfer request control unit 2E, and an output from a node OUTPUT is not applied to any node.

Down counter 61 is initialized when the input signal at node /CLR attains "L". When the input signal to node LOAD attains "H", the initialization value INPUT is loaded as the initial value, to down counter 61. Nodes ENP and /ENT are both enable terminals and only when the input signal at node ENP is "H" and the input signal at node /ENT is "L", down counter 61 counts down. The counted value is output from node OUTPUT. When the count value reaches 0, a pulse having one clock width is output from node RCO.

When transfer control circuit 2A is in the operation mode in which it operates as a self-synchronous transfer control circuit similar to the prior art example, that is, when the mode signal MS is at "L", output INHB is fixed at the "H" and the function of NAND gate 141 is equivalent to that of the conventional NAND gate 140. In other words, in this mode, transfer request control unit 2E of transfer control circuit 2A is virtually disabled, and hence circuit 2A operates as the self-synchronous transfer control circuit similar to the conventional one shown in FIG. 9.

The operation when mode signal MS is at "H" will be described with reference to the time chart of FIG. 4. Assume that mode signal MS is set to "H" by an external control apparatus, not shown, and the circuit shown in FIG. 2 has received as an input the master reset signal /MR and is initialized.

In down counter 61, as master reset signal MR is applied to node /CLR, outputs from nodes RCO and OUTPUT are initialized and at "L". Now, assume that the input value of node IN of down counter 61 is fixed to 4. In this case, in down counter 61, 4 as the initial value is loaded, in response to the mode signal MS attaining "H".

At time T of FIG. 4, acknowledge signal RO is at "H". Accordingly, pulse CI requesting data transfer input through the data transmission line of the preceding stage falls to "L". Pulse CI sets RS flipflop 111, and therefore a signal at "H" is applied to node Q. The input signal to node Q is output as acknowledge signal RO at "L" through inverter 130.

Consequently, transfer inhibition signal inhibiting new data transfer is applied to the transfer control circuit of the preceding stage. At the same time, pulse CI is input to node K of D type flipflop 21 through inverter 31.

D type flipflop 21 receives pulse CI at node K through inverter 31, and in response to the rise of node K to "H", latches output signal at node /Q of D type flipflop 11. As a result, nodes Q of D type flipflops 11 and 21 provide signals of opposite levels, which signals are input to EXOR gate 41. Consequently, the output from EXOR gate 41 attains "H", and the output INHB of NAND gate 51 attains "L".

After a prescribed time period, pulse CI requesting data transfer returns to "H". Even when pulse CI has returned to "H", node Q of RS flipflop 111, output node of inverter 180 and acknowledge signal RI are all at "H", the output G of NAND gate 141 is maintained at "H" as long as the output INHB is at "L", and hence output pulse CO does not attain to "L". Therefore, the transfer request signal is not transmitted to the transfer control circuit of the succeeding stage.

In this manner, by setting mode signal MS at "H", the transfer request signal indicated by pulse CI applied from the transfer control circuit of the preceding stage is prevented from being transferred to the transfer control circuit of the succeeding stage, in transfer control circuit 2A.

In response to the acknowledge signal RO being "L" and returning of pulse CI as the transfer request signal to "H", down counter 61 starts counting down in timing adjustment circuit 2D. In down counter 61, initial value is set to 4 when mode signal MS attains to "H". Accordingly, in response to the externally input clock CLK rising to "H" four times from the start of counting down, down counter 61 raises the output signal from node RCO to "H".

The node RCO of down counter 61 is connected to input node K of clock CK of transfer request control unit 2E, and hence node K rises to "H". In response, D type flipflop 11 latches the output signal at node Q of D type flipflop 21. As a result, output signals at nodes Q of flipflops 11 and 21 come to have the same level. Accordingly, the output from EXOR gate 41 attains "L", and the output signal INHB of NAND gate 51 rises to "H".

When output signal INHB rises to "H", the output signal from NAND gate 141 falls to "L". Consequently, RS flipflop 111 is reset, and RS flipflop 112 is set. As node /Q of RS flipflop 112 falls to "L", output pulse CP rises to "H", and applied as clock pulse CP2 to data holding circuits 2B and 2C. Data holding circuits 2B and 2C receive the applied data DII and DI in response to the input of pulse CP2, latch the data and outputs the data as data DOO and DO.

Further, the output from node /Q of RS flipflop 112 is output as pulse CO through inverters 170 and 180 as well as delay element 190. Therefore, pulse CO attains "L" after a prescribed time period determined by a time constant of delay element 190, and therefore data transfer request signal is applied to the transfer control circuit of the succeeding stage.

Further, after a prescribed time period, a signal inhibiting data transfer is transmitted from the transfer control circuit of the succeeding stage and acknowledge signal RI falls to "L", so that RS flipflop 112 is reset, and in response, pulse CP returns to "L" and pulse CO returns to "H", respectively. Accordingly, data latching operation of data holding circuits 2B and 2C latching data DII and DI is inhibited, and transfer of new data DOO and DO to the transfer control circuit of the succeeding stage is inhibited.

As described above, in the period in which mode signal MS is set at "H", transfer of pulse CI as the data transfer request signal to the succeeding stage can readily be controlled based on the signal level of clock CK output from timing adjustment circuit 2D. Therefore, by setting the mode signal MS to a desired signal level by external control and by fixing the initial value INPUT applied to timing adjustment circuit 2D at a desired value, it becomes possible to take in and transmit an output signal (data DII) of external clock synchronous circuit 4 in an asynchronous data transmission apparatus including a data driven type information processing unit, at a desired arbitrary timing.

By setting the initialization value INPUT variably at a desired value by external control, similar effects can be obtained, rather than fixing the initial value INPUT applied to timing adjustment circuit 2D at a desired value.

Though a circuit receiving and holding data DII is provided separate from the circuit receiving and holding data DI, both data may be received and held by a single holding circuit.

Figure 5:
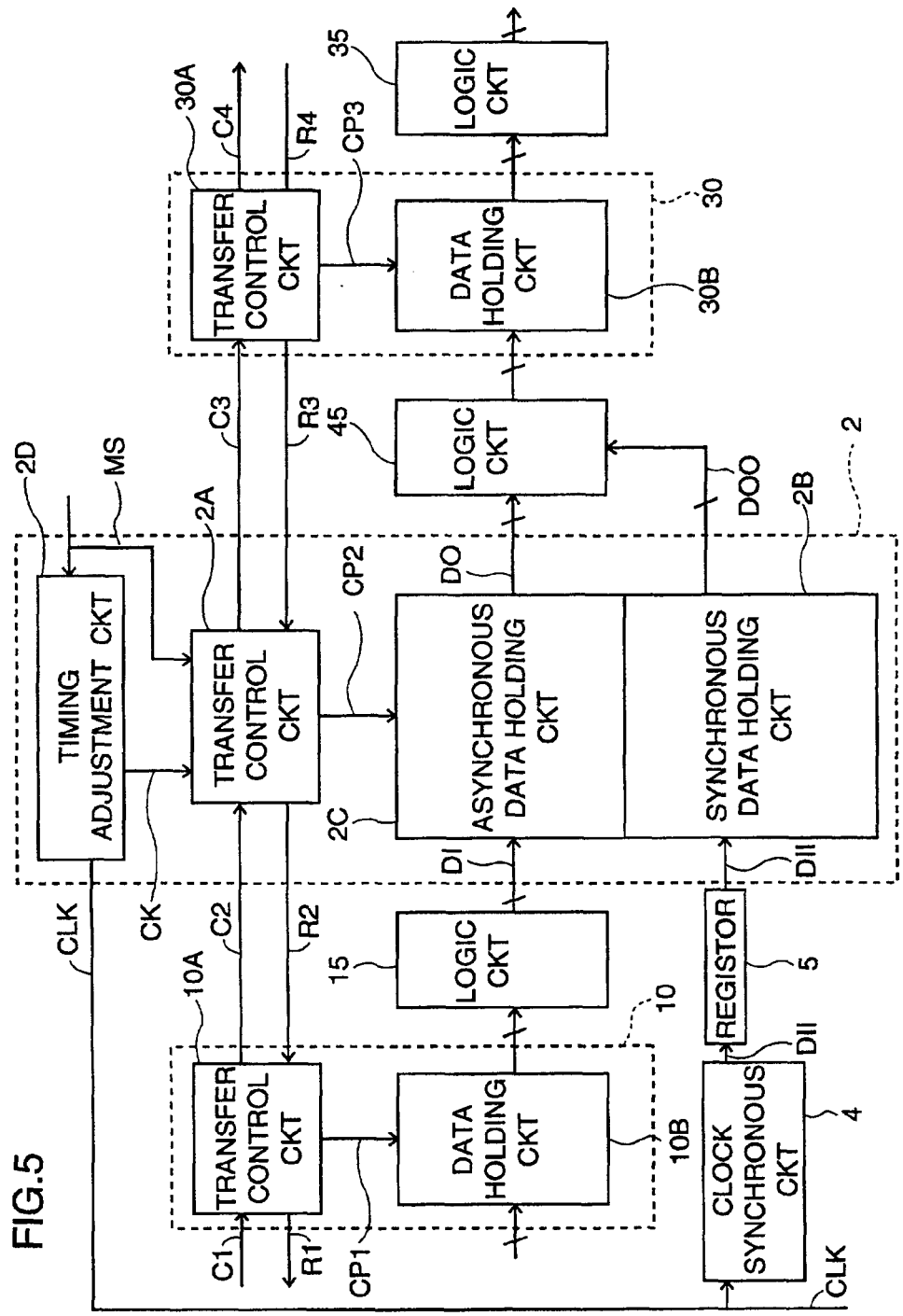
FIG. 5 shows a modification of the configuration of the data processing apparatus shown in FIG. 3.

FIG. 5 shows a modification of the configuration of the data processing apparatus shown in FIG. 3. In the apparatus of FIG. 5, in order to take data DII from clock synchronous circuit 4 continuously to data transmission line 2, a register 5 is provided between clock synchronous circuit 4 and synchronous data holding circuit 2B.

If output data DII from clock synchronous circuit 4 changes faster than asynchronous handshake of the asynchronous data transmission apparatus, for example, it is not possible to continuously take data DII in the data transmission apparatus. In order to avoid this situation, register 5 is provided. By the provision of register 5 as shown in FIG. 5, it becomes possible to continuously take data DII into the asynchronous data transmission apparatus.

Figure 6:
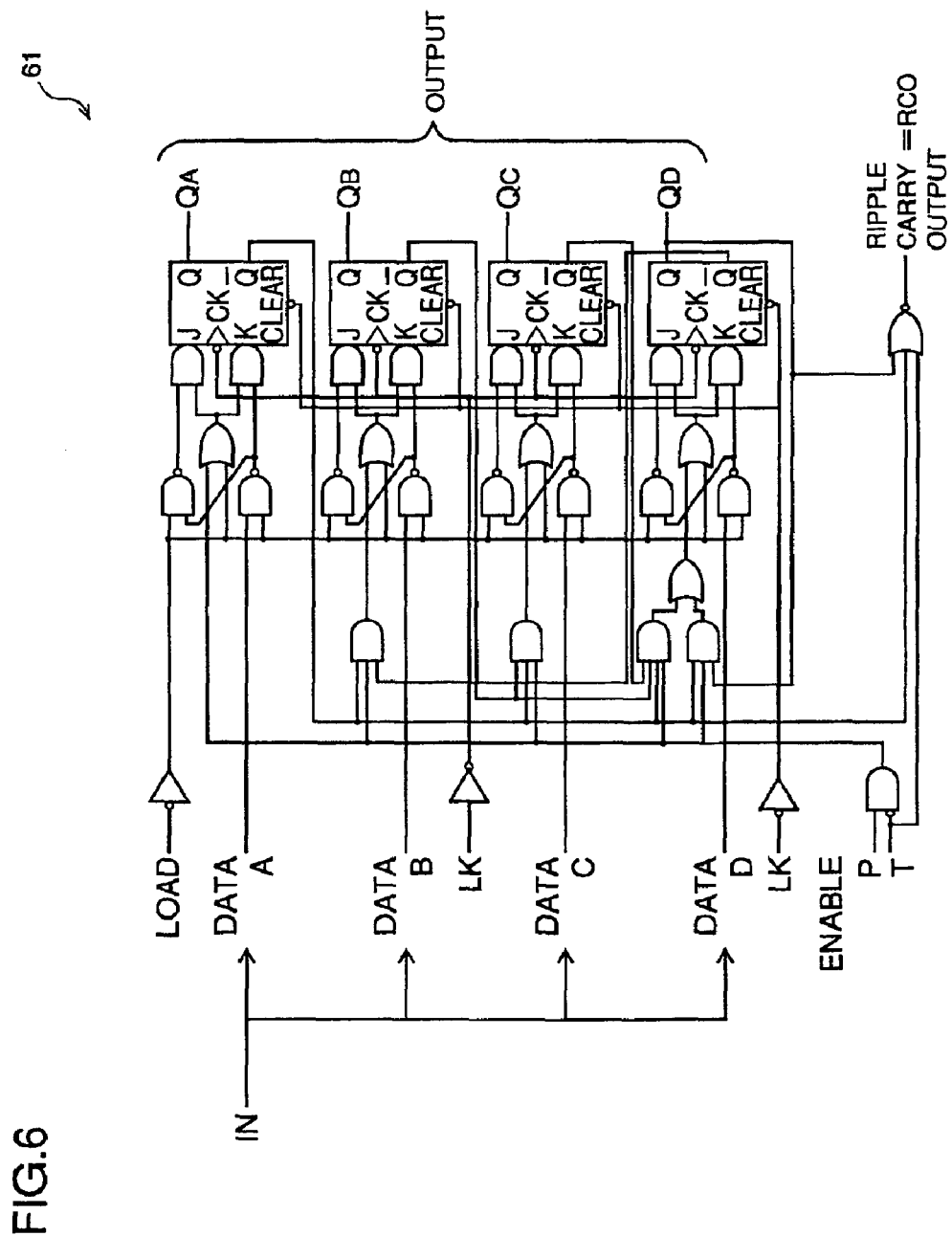
FIG. 6 is a circuit diagram of a down counter shown in FIG. 2.
Figure 7:
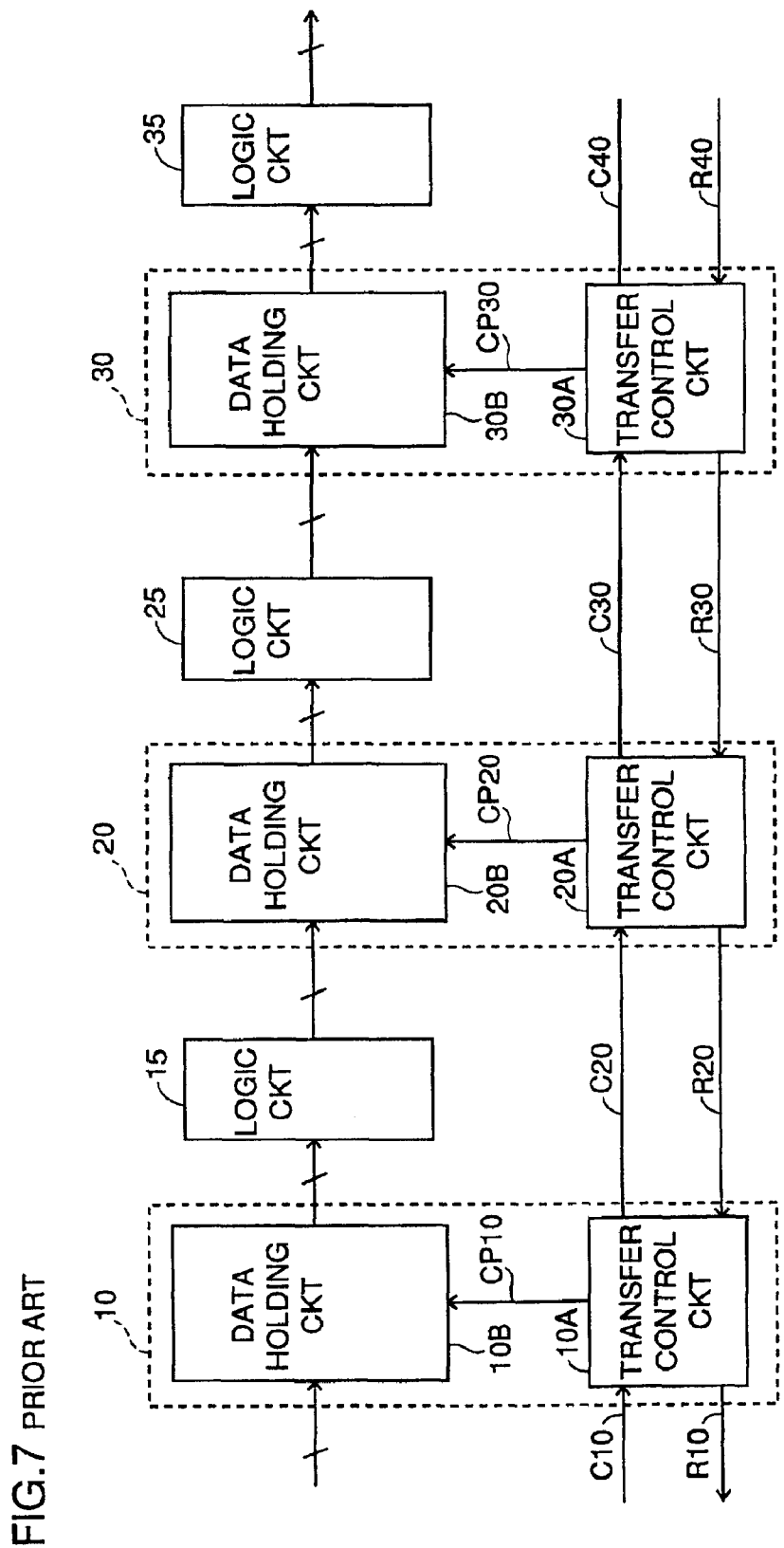
FIG. 7 is a block diagram showing an example of a conventional data transmission apparatus adapting handshake method.
Figure 8:
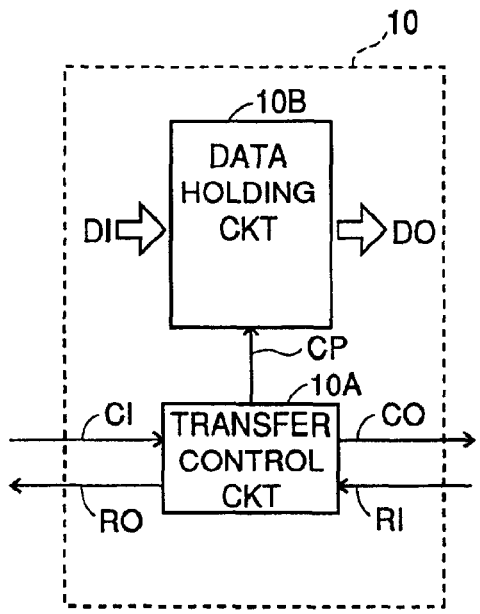
FIG. 8 is a block diagram showing a configuration of the data transmission line shown in FIG. 7.

FIG. 6 shows a circuit configuration of down counter 61 shown in FIG. 2. The circuit configuration is based on a circuit disclosed in *Digital SystemDesign*, CQ Shupansha, p.231. The initialization value INPUT input to down counter 61 is set by relative speed relation, dependent on whether the input clock CLK to node LK is fast or if the data driven information processing is at high speed. More specifically, the minimum value which ensures taking of output data DII from the synchronous system to the asynchronous data transmission apparatus may be set as the initialization value INPUT. The time necessary for taking output data DII from dock synchronous circuit 4 in the asynchronous data transmission apparatus accurately may be calculated through simulation in designing, for example, and the initialization value INPUT may be determined using a value corresponding to the simulated value.

Even when mode signal MS is set and kept at "H" for too long, the handshake time of the asynchronous data transmission line is made longer only slightly. Therefore, a time necessary for taking output data DII from the synchronous system to the asynchronous data transmission apparatus may be found at the time of design and mode signal MS may be set and kept at "H" longer. If more precise control is required, a mechanism for monitoring dock pulse CP2 of FIG. 3 may be provided. Data taking is complete at the moment when a clock pulse CP2 rises to "H" after the rise of mode signal MS to "H". The mode signal MS may be changed from "H" to "L" in response.

Although the present invention has been described and illustrated in detail, it is dearly understood that the same is by way of illustration and example only and is not to be taken by way of limitation, the spirit and scope of the present invention being limited only by the terms of the appended claims.

What is claimed is:

1. A data transmission line, used continuously, connected in a plurality of stages in an asynchronous system, comprising:
    a data holding unit receiving and holding data transmitted from a preceding stage or data output from an external synchronous system, and outputting and transmitting the data received and held to a succeeding stage;
    a transfer control unit for controlling input and output of said data at said data holding unit; and
    an adjustment unit for adjusting timing of input of one of the data output from said synchronous system or the data transmitted in the asynchronous system from said preceding stage to said data holding unit, by said transfer control unit, when a mode in which data output from said synchronous system is taken and transmitted to said data transmission line.

2. The data transmission line according to claim 1, further comprising
    buffer means controlled by said synchronous system,
    said buffer means provided between said synchronous system and said data holding unit, receiving and temporarily holding output data of said synchronous system and outputting the data to said data holding unit.

3. The data transmission line according to claim 2, wherein said mode designation is canceled in response to completion of data input to said data holding unit.

4. The data transmission line according to claim 3, wherein
    said transfer control unit includes, in order to transfer a first pulse applied from said preceding stage as a second pulse to said succeeding stage, in accordance with an instruction signal instructing transfer acknowledgement or inhibition,
    first storage means for storing said first pulse,
    a second storage means reset in response to inhibition state of said instruction signal,
    third storage means reset in response to an input of said first pulse and reset in response to an arbitrary applied third pulse input, and
    logic means for outputting a fourth pulse in response to a fact that said first storage means is storing said first pulse, said first pulse is not being applied to said first storage means, said second storage means is reset, said instruction signal is in acknowledged state, and said third storage means is reset,
    said first storage means being reset by an input of said fourth pulse, said second storage means storing said fourth pulse and generating said second pulse; and
    said adjustment unit generates, in response to a fact that said first storage means stores said first pulse and said first pulse is not being applied to said first storage means, said third pulse with a desired timing between data transfer of said asynchronous system and a clock of said synchronous system.

5. The data transmission line according to claim 4, wherein said data holding unit includes an asynchronous holding circuit for holding data transmitted in said asynchronous system, and a synchronous holding circuit for holding data output from said synchronous system.

6. The data transmission line according to claim 5, wherein said asynchronous system includes a data driven type information processing unit, and said synchronous system includes a clock synchronous information processing unit.

7. The data transmission line according to claim 1, wherein said mode designation is canceled in response to completion of input to said data holding unit.

8. The data transmission line according to claim 7, wherein said transfer control unit includes, in order to transfer a first pulse applied from said preceding stage as a second pulse to said succeeding stage, in accordance with an instruction signal instructing transfer acknowledgement or inhibition,
    first storage means for storing said first pulse,
    a second storage means reset in response to inhibition state of said instruction signal,
    third storage means reset in response to an input of said first pulse and reset in response to an arbitrary applied third pulse input, and logic means for outputting a fourth pulse in response to a fact that said first storage means is storing said first pulse, said first pulse is not being applied to said first storage means, said second storage means is reset, said instruction signal is in acknowledged state, and said third storage means is reset, said first storage means being reset by an input of said fourth pulse, said second storage means storing said fourth pulse and generating said second pulse; and said adjustment unit generates, in response to a fact that said first storage means stores said first pulse and said first pulse is not being applied to said first storage means, said third pulse with a desired timing between data transfer of said asynchronous system and a clock of said synchronous system.

9. The data transmission line according to claim 1, wherein said transfer control unit includes, in order to transfer a first pulse applied from said preceding stage as a second pulse to said succeeding stage, in accordance with an instruction signal instructing transfer acknowledgement or inhibition, first storage means for storing said first pulse, a second storage means reset in response to inhibition state of said instruction signal, third storage means reset in response to an input of said first pulse and reset in response to an arbitrary applied third pulse input, and logic means for outputting a fourth pulse in response to a fact that said first storage means is storing said first pulse, said first pulse is not being applied to said first storage means, said second storage means is reset, said instruction signal is in acknowledged state, and said third storage means is reset, said first storage means being reset by an input of said fourth pulse, said second storage means storing said fourth pulse and generating said second pulse; and said adjustment unit generates, in response to a fact that said first storage means stores said first pulse and said first pulse is not being applied to said first storage means, said third pulse with a desired timing between data transfer of said asynchronous system and a clock of said synchronous system.

10. A data transmission line, connected in a plurality of stages in an asynchronous system, comprising:

a data holding unit configured to receive, hold, and output synchronous and asynchronous data;

a transfer control unit configured to control input and output of the data at the data holding unit;

an adjustment unit configured to adjust timing of input of the data to the data holding unit by the transfer control unit; and a mode signal to identify whether the data input to the data holding unit is synchronous data or asynchronous data, wherein the adjustment unit may adjust the timing of input of the data to the data holding unit based upon the mode signal.

11. The data transmission line of claim 10, wherein the adjustment unit adjusts the timing of input of the data to the data holding circuit when the mode signal identifies the data being input to the data holding unit as synchronous data received from an external system.

12. The data transmission line of claim 11, wherein the adjustment unit adjusts the timing by enabling a clock signal.

13. The data transmission line of claim 10, wherein asynchronous data and data received from an external synchronous system are processed in an asynchronous system.

* * * * *